Patented Oct. 5, 1948

2,450,405

UNITED STATES PATENT OFFICE 2,450,405

MINERAL OIL COMPOSITION AND IMPROVING AGENT THEREOF

Henry G. Berger, Thomas T. Noland, and Everett W. Fuller, Woodbury, N. J., assignors to Socony-Vacuum Oil Company, Incorporated, a corporation of New York No Drawing. Application December 23, 1943, Serial No. 515,418

13 Claims. (Cl. 252—46.6)

This invention has to do with the stabilization of petroleum products against the harmful effects of oxidation and deterioration with use. More specifically, it has to do with the improvement or stabilization of mineral oil fractions, particularly viscous mineral oils, by the use of novel reaction products, or a novel class of reaction products, which when admixed with a mineral oil in minor proportions will prevent or delay undesirable changes taking place in the oil.

To those familiar with the art it is well known that substantially all of the various fractions obtained from mineral oils and refined for their various uses are susceptible to oxidation. This susceptibility of an oil fraction to oxidation and the manner in which oxidation manifests itself within the oil varies with the type and degree of refinement to which the oil has been subjected and with the conditions under which the oil is used or tested. In other words, the products formed in an oil fraction as a result of oxidation and the degree to which they are formed depends upon the extent to which the various unstable constituents which may act as oxidation catalysts have been removed by refining operations and also upon the conditions of use.

A large number of characterizing ingredients have been proposed for use as improving agents for petroleum products. For example, various materials containing sulfur or phosphorus, or combinations of these elements, have been suggested as stabilizing agents for viscous petroleum oils. Phosphorus- and sulfur-containing reaction products of numerous hydrocarbons and $P_2S_5$ are typical examples of such agents. Although some of these reaction products are fairly effective as mineral oil stabilizing agents, they are not entirely satisfactory for various reasons. Some of them suffer from the disadvantage of limited oil solubility or even complete oil insolubility. Some considerably darken the oils in which they are incorporated. Their outstanding shortcomings, however, reside in their relatively low degree of heat stability and their strong tendency to corrode metals such as copper.

The present invention is predicated upon the discovery of a novel class of stable, oil-soluble phosphorus- and sulfur-containing reaction products which are capable of affecting improvement of petroleum fractions, particularly viscous mineral oil fractions. These reaction products prevent the formation of acidic oxidation products and sludge in an oil as well as inhibit the corrosion of metal engine parts such as hard metal bearings. They are also stable to heat and do not appreciably darken the oils in which they are used.

The improving agents contemplated herein are stable, oil-soluble phosphorus- and sulfur-containing reaction products obtained by reaction of phosphorus pentasulfide and a cycle stock characterized by an olefin and an aromatic content of from about 3 to about 7 per cent and from about 40 to about 60 per cent, respectively, under the following interrelated reaction conditions:

1. Between about 1 and about 8 per cent by weight of $P_2S_5$ based upon the weight of said cycle stock,
2. A temperature between about 125° C. and about 200° C. and
3. A relatively short reaction time.

The hydrocarbon reactants are, as indicated above, cycle stocks containing from about 3 to about 7 per cent of olefins and from about 40 to about 60 per cent of aromatics, as determined by the following test method:

Twenty-five milliliters of a solution containing 70 per cent by weight of sulfuric acid (sp. gr. 1.84) and 30 per cent of $P_2O_5$ are placed in a glass stoppered sulfonation bottle (a modified Babcock Bottle—A. S. T. M. Standards on Petroleum Products and Lubricants, September 1943, page 381). The bottle is immersed in ice water for five minutes; then 10 milliliters of the hydrocarbon are added. The bottle is shaken for 10 minutes while cooling with ice water. Sulfuric acid (sp. gr. 1.84) is added until the top meniscus of the hydrocarbon layer is brought up to the 100 per cent mark on the graduated portion of the neck. The bottle is then stoppered and is centrifuged for 10 minutes. The milliliters of hydrocarbon oil layer remaining are read and this value is subtracted from the original 10 milliliters to obtain the combined amounts of aromatic and olefin contents of the sample. By repeating the same procedure, except for using 85 per cent sulfuric acid instead of the $H_2SO_4$-$P_2O_5$ mixture, the olefinic content of the sample is obtained. Thus olefinic content subtracted from the combined olefin and aromatic content gives the amount of aromatic material present.

Preferably, the hydrocarbon reactants are also characterized by the following: boiling range from about 90° C. to about 400° C. and specific gravity from about 0.88 to about 0.93. In general, such cycle stocks are obtained from thermal cracking operations of crude oils; but other stocks characterized as above may also be used. Typical of such other stocks are light gas oils, such as a light gas oil containing 4 per cent olefins and 46 per cent aromatics, a specific gravity of 0.8833 and a boiling range from 150° C. to 380° C. For this reason, the hydrocarbon reactants may be broadly considered as hydrocarbon stocks characterized by the aforesaid percentages of olefins and aromatics.

The amount of $P_2S_5$ reacted with the cycle stocks contemplated herein is an important consideration. Stable, oil-soluble reaction products containing appreciable quantities of phosphorus and sulfur are obtained when the amount of $P_2S_5$ so reacted is from about 1 to about 8 per cent by weight of the hydrocarbon reactant. Particularly preferred reaction products, however, are obtained with about 5 per cent by weight of $P_2S_5$. When amounts of the order of 10 and 15 per cent of $P_2S_5$ are used, it has been found that the phosphorus- and sulfur-containing reaction products obtained therewith are unstable when heated and are oil-insoluble. As used herein the term "oil soluble" is descriptive of those reaction products which are soluble in oil in amounts of at least 1 per cent by weight.

Another important consideration in the preparation of the aforesaid reaction products is reaction time. In general, superior reaction products, in quantities such as shown in the following examples, are obtained when the reaction time is relatively short, such as from about 2 hours to about 8 hours. While reaction times as long as about 12 hours have been used and satisfactory reaction products obtained therewith, reaction times in the neighborhood of 4 hours are preferred. It is to be understood, however, that the reaction time may be varied considerably depending upon the quantities of reactants and the reaction temperatures used in the preparation of said reaction products.

The interrelation of the foregoing reaction factors will be apparent from the following typical examples recited below, and also those set forth in Table I.

EXAMPLE ONE

A reaction stock—Recycle Stock A—from a thermal liquid phase cracking operation and having the following characteristics, was used:

Olefin content_____%__ 6
Aromatic content_____%__ 47
Specific gravity_____ 0.8939
Aniline number_____ 105.5
Boiling range (°C.):
    Initial B. Pt._____ 97
    10 _____%__ 230
    50 _____%__ 274
    90 _____%__ 327
    End point_____ 366
    Recovery _____%__ 98.5

One thousand grams of Recycle Stock A was reacted, with stirring, with 70 grams of $P_2S_5$ at 180° C. for 8 hours. The reaction mixture thus obtained was diluted with naphtha (boiling range 88–135° C.), washed with 20 per cent $Na_2S$ solution, water washed, filtered and the filtrate heated to 150° C. at 10 mm. pressure to remove the naphtha. The reaction product contained 1.19 per cent phosphorus and 3.06 per cent sulfur, and is identified hereinafter as Product A.

EXAMPLE TWO

One thousand grams of Recycle Stock A was reacted, with stirring, with 50 grams of $P_2S_5$ at 150° C. for 8 hours. The reaction mixture so obtained was then cooled to 100° C., 52.5 grams (5 per cent by weight) of Attapulgus clay was added thereto and the clay was subsequently removed therefrom by filtering. The reaction product—Product B—contained 1.26 per cent phosphorus and 3.6 per cent sulfur.

EXAMPLE THREE

Five hundred grams of Product B obtained in Example Two were vacuum distilled to a maximum temperature of 172° C. at 3 mm. in order to remove unreacted recycle stock therefrom. The residue—Product C—contained 3.34 per cent phosphorus and 7.9 per cent sulfur.

Reaction products obtained from Recycle Stock A and prepared as in Example Two above are shown in Table I below in order to demonstrate the influence of each of the several reaction variables—time, temperature and concentration of $P_2S_5$. The copper strip tests referred to in the table were made by immersing a polished copper strip in a 1 per cent blend of a reaction product in oil and heating the blend at 100° C. for 24 hours. The copper strip test indicates the presence or absence of free or active sulfur which corrodes copper. An asterisk (*) has been used in the table wherever the copper strip used in the copper strip test was not corroded in each test; that the reaction product was stable; and that the reaction product was soluble in oil.

Table I

| | Product | Per cent $P_2S_5$ (by wt.) | Temp. (°C.) | Time (hrs.) | Composition | | Copper Strip Test | Stability | Solubility |
|---|---|---|---|---|---|---|---|---|---|
| | | | | | Per cent P | Per cent S | | | |
| Temp_____ | D | 5 | 150 | 4 | 1.41 | 3.4 | * | * | * |
| | E | 5 | 190-200 | 4 | 1.23 | 3.8 | * | * | * |
| | F | 5 | 220 | 4 | ---- | ---- | ---- | Unstable | Insoluble |
| Time_____ | D | 5 | 150 | 4 | 1.41 | 3.4 | * | * | * |
| | G | 5 | 150 | 8 | 1.26 | 3.6 | * | * | * |
| | H | 5 | 150 | 12 | 1.2 | 3.4 | * | * | * |
| Conc. of $P_2S_5$_____ | I | 2.5 | 150 | 4 | 0.62 | 1.89 | * | * | * |
| | D | 5 | 150 | 4 | 1.41 | 3.4 | * | * | * |

It will be apparent from the data tabulated in Table I above that reaction temperatures in excess of 200° C. are unsatisfactory. The desired reaction products as indicated in Table I are those prepared under the reaction conditions defined hereinabove.

Another cycle stock which was also found to be particularly desirable was a cycle stock, obtained from a Cross Still, and characterized by the following:

Olefin content_____%__ 5
Aromatic content_____%__ 57
Specific gravity_____ 0.9236
Aniline number_____ 80
Boiling range_____°C__ 140-370

While Products A, B and C shown above in Examples One through Three, and Products D, E, G, H and I shown in Table I are particularly desirable for use in petroleum fractions, related reaction products prepared in a similar manner from other hydrocarbon reactants are undesirable for such use. The data presented in Table II below is illustrative of their undesirable character. The copper strip tests referred to in this table were obtained in the manner described in connection with Table I. The heat stability tests shown in Table II were made by heating a 1 per cent blend of a reaction product in oil at 100° C. for 24 hours. An asterisk has been used as in Table I to indicate that the copper strip in the copper strip tests was not corroded in each test, and that the reaction product was stable to heat.

corrosive action may be quite severe upon said bearings such as those having the corrosion susceptibility of Cd—Ag alloys and may cause their failure within a comparatively short time. The following test is used to determine the corrosive action of motor oil on an automobile connecting rod bearing.

The oil used consisted of Pennsylvania neutral and residium stocks separately refined by means of chlorex and then blended to give an S. A. E. 20 motor oil with a specific gravity of 0.872, a flash point of 435° F. and a Saybolt Universal viscosity of 318 seconds at 100° F. The oil was tested by adding a section of a bearing containing a Cd—Ag alloy surface, weighing about 6 grams, Table II

| Hydrocarbon | Product | Percent P₂S₅ (by wt.) | Temp. (°C.) | Time (hours) | Composition | | Copper Strip Test | Heat Stability | Remarks |
|---|---|---|---|---|---|---|---|---|---|
| | | | | | Percent P | Percent S | | | |
| Catalytically Cracked Cycle Stock: Percent Olefin, 3 Percent Aromatic, 35 | M | 5 | 190–195 | 4½ | 0.88 | 2.1 | Corrosive black strip. | Poor; sludge deposited. | Sludge formed during reaction; additional oil-insoluble sludge separated on standing. |
| Catalytically Cracked Cycle Stock: Percent Olefin, 1 Percent Aromatic, 35 | N | 5 | 190–195 | 4½ | 1.04 | 2.0 | ----do---- | ----do---- | Do. |
| No. 2 Fuel Oil from Catalytic Cracking Operation: Percent Olefin, 0 Percent Aromatic, 36 | O | 5 | 180–200 | 2½ | | | | Unstable | Do. |

It will be apparent from the results set forth in Table II above that the reaction products of hydrocarbon reactants which are not characterized by the required olefin and aromatic contents defined above are greatly inferior to the related reaction products from the cycle stocks contemplated herein and illustrated in Examples One through Three and in Table I. For example, it is apparent that the reaction products obtained from the catalytic cycle stocks and the No. 2 Fuel Oil defined in Table II are corrosive to copper and are unstable when heated, being so unstable when heated that considerable quantities of oil insoluble sludge are deposited therefrom. Thus, the latter reaction products have little or no value as addition agents for petroleum fractions, particularly viscous mineral oils. On the contrary, however, the reaction products contemplated herein are not corrosive to copper and are stable when heated. It will be recognized, therefore, that the reaction products of this invention are much more marketable in the oil industry and other industries than are the related reaction products of such hydrocarbon reactants as those shown above in Table II.

To demonstrate the effectiveness of the reaction products of this invention as mineral oil improving agents, oil blends were prepared containing small quantities of representative reaction products and the blends and the blank oils were subjected to the various tests hereinafter described. It will readily be seen from inspection of the results of these tests that our reaction products are extremely effective in stabilizing mineral oils.

CORROSION INHIBITION

Motor oils, especially those refined by certain solvent extraction methods tend to oxidize when submitted to high temperatures and to form products that are corrosive to metal bearings. This and heating it to 175° C. for 22 hours while a stream of air was bubbled against the surface of the bearing. The loss in weight of the bearing during this test measures the amount of corrosion that has taken place. A sample of the oil containing a stabilizing agent was run at the same time as a sample of the straight oil, and the loss in weight of the bearing section in the inhibited oil can thus be compared directly with the loss of the section in the uninhibited oil. The results are set forth in Table III below.

Table III

| Reaction Product | Conc., percent | Mgms. Loss in Weight | |
|---|---|---|---|
| | | Inhibited | Uninhibited |
| Product A | 1.0 | 0 | 33 |
| Product B | 1.0 | 0 | 36 |
| Product B | 0.5 | 0 | 36 |
| Product C | 0.5 | 0 | 45 |
| Product C | 0.10 | 0 | 45 |

LAUSON ENGINE TEST

To further demonstrate the effectiveness of the reaction products of this invention as petroleum stabilizing agents a blank oil and a blend of the oil and a typical reaction product, Product A, were subjected to a Lauson engine test. In this test a single cylinder Lauson engine was run with an oil temperature of 290° F. and a jacket temperature of 212° F. The oil was S. A. E. 10 motor oil, solvent refined. The acidity as measured by the neutralization number (N. N.) and the viscosity in centistokes at 210° F. of the oil blank and oil blend were determined after 36 hours.

The results of these tests are presented in Table IV below.

Table IV

|                    | N. N. | K. V. @ 210° F. |
|--------------------|-------|-----------------|
| Oil alone          | 10.8  | 9.71            |
| Oil + 1% Product A | 1.2   | 6.13            |

RING STICKING AND SLUDGE INHIBITION

That the reaction products contemplated herein are particularly effective in decreasing the tendency of petroleum lubricating oils to cause ring sticking and sludge deposition during the operation of an internal combustion engine is denoted by the results given below in Table V. This is shown by results of the following test which involves the operation of a single cylinder C. F. R. engine at a speed of 1200 R. P. M. over a time interval of 28 hours. The temperature of the cooling medium of the engine was held at approximately 370° F. and the oil temperature was held at 175° F. during the test. The oil used was a lubricating oil stock of 120 seconds Saybolt Universal viscosity at 210° F. and the conditions observed at the end of the test were: (a) the extent to which the piston rings were stuck, (b) the extent to which the slots in the oil rings were filled with carbonaceous deposits in the oil, and (c) the acidity or neutralization number (N. N.) of the oil. The results obtained from the blank oil and a representative blend of the oil and a typical reaction product, Product A, are set forth in Table V below.

Table V

|                       | Ring Condition, Degrees Stuck |   |     |     |     | Slots, percent Filled |     |     | Deposits | N. N. |
|-----------------------|-----|----|-----|-----|-----|----|-----|----|------|------|
|                       | 1   | 2  | 3   | 4   | 5   | 3  | 4   | 5  |      |      |
| Oil alone             | 180 | 90 | 360 | 360 | 270 | 40 | 80  | 60 | 16.1 | 1.6  |
| Oil + 1% Product A    | (¹) | 0  | 0   | 0   | 0   | 10 | (²) | 0  | 10.4 | 1.6  |

¹ Tacky.
² Trace.

The results set forth in the foregoing Tables III through V demonstrate that the reaction products contemplated herein prevent the corrosion of hard metal bearings and inhibit the development of acids and the formation of gummy deposits in engines during use. They further indicate that the said reaction products prevent a substantial increase in viscosity of the oil from taking place during such use.

Concentrations from 0.1 to 5.0 per cent may be used to affect a substantial stabilization of the oil fraction. In general, however, from 0.1 to 2.0 per cent will be sufficient. Further, however, if the reaction products are in concentrated form, as Product C, which was obtained by distilling off part of the unreacted cycle stock from Product B, correspondingly smaller concentrations may be used. Our reaction products may be used either in straight petroleum fractions or in fractions containing other additives used for other purposes such as detergents, pour point depressants, V. I. improving agents, etc., in which case they serve to stabilize the resulting blend without detracting from the effectiveness of the other additive or additives that may be present.

It is to be understood that while we have hereinabove described typical procedures for making the oil addition agents contemplated herein and have referred to certain specific reaction products and specific mineral oils, the invention is not limited thereto but includes variations of the procedures, and other typical reaction products and petroleum products coming within the scope of the appended claims.

We claim:

1. An improved mineral oil composition comprising a mineral oil fraction having in admixture therewith a minor proportion, sufficient to enhance the stability of said mineral oil fraction, of a stable, oil-soluble, phosphorus- and sulfur-containing reaction product obtained by reaction of phosphorus pentasulfide and a thermal cycle stock at a temperature between about 125° C. and about 200° C. for a relatively short reaction time whereupon a stable, oil-soluble product is obtained, said cycle stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of the said cycle stock.

2. An improved mineral oil composition comprising a mineral oil fraction having in admixture therewith a minor proportion, from about 0.1 per cent to about 5 per cent, of a stable, oil-soluble, phosphorus- and sulfur-containing reaction product obtained by reaction of phosphorus pentasulfide and a thermal cycle stock at a temperature between about 125° C. and about 200° C. for a relatively short reaction time whereupon a stable, oil-soluble product is obtained, said cycle stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of the said cycle stock.

3. An improved mineral oil composition comprising a mineral oil fraction having in admixture therewith a minor proportion, from about 0.1 per cent to about 2.0 per cent, of a stable, oil-soluble, phosphorus- and sulfur-containing reaction product obtained by reaction of phosphorus pentasulfide and a thermal cycle stock at a temperature between about 125° C. and about 200° C. for a reaction time, of from about 2 hours to about 8 hours, said cycle stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of the said cycle stock.

4. An improved mineral oil composition comprising a mineral oil fraction having in admixture therewith a minor proportion, sufficient to enhance the stability of said mineral oil fraction, of a stable, oil-soluble, phosphorus- and sulfur-containing reaction product obtained by reaction of phosphorus pentasulfide and a thermal cycle stock at a temperature between about 125° C. and about 200° C. for a reaction time from about 2 hours to about 8 hours, said cycle stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of the said cycle stock.

5. An improved mineral oil composition comprising a mineral oil fraction having in admixture therewith a minor proportion, sufficient to enhance the stability of said mineral oil fraction, of a stable, oil-soluble, phosphorus- and sulfur-containing reaction product obtained by reaction of phosphorus pentasulfide and a thermal cycle stock at about 150° C. for about eight hours, said cycle stock being characterized by an olefin content of from about 3 per cent to about 7 per cent and an aromatic content of from about 40 per cent to about 60 per cent, and the said phosphorus pentasulfide representing about 5 per cent by weight of the said cycle stock.

6. An improved mineral oil composition comprising a mineral oil fraction having in admixture therewith a minor proportion, sufficient to enhance the stability of said mineral oil fraction, of a stable, oil-soluble, phosphorus- and sulfur-containing reaction product obtained by reaction of phosphorus pentasulfide and a thermal recycle stock at about 150° C. for about eight hours, said thermal recycle stock being characterized by an olefin content of about 6 per cent and an aromatic content of about 57 per cent, and the said phosphorus pentasulfide representing about 5 per cent by weight of the said thermal recycle stock.

7. An improved mineral oil composition comprising a mineral oil fraction having in admixture therewith a minor proportion, sufficient to enhance the stability of said mineral oil fraction, of a stable, oil-soluble, phosphorus- and sulfur-containing reaction product obtained by reaction of phosphorus pentasulfide and a thermal recycle stock at about 150° C. for about four hours, said thermal recycle stock being characterized by an olefin content of about 5 per cent and an aromatic content of about 47 per cent, and the said phosphorus pentasulfide representing about 5 per cent by weight of the said thermal recycle stock.

8. As a new composition of matter, a stable, oil-soluble, phosphorus- and sulfur-containing reaction product obtained by reaction of phosphorus pentasulfide and a thermal cycle stock at a temperature between about 125° C. and about 200° C. for a relatively short time whereupon a stable, oil-soluble product is obtained, said stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of said hydrocarbon stock.

9. As a new composition of matter, a stable, oil-soluble, phosphorus- and sulfur-containing reaction product obtained by reaction of phosphorus pentasulfide and a thermal cycle stock at a temperature between about 125° C. and about 200° C. for a relatively short reaction time whereupon a stable, oil-soluble product is obtained, said cycle stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of the said cycle stock.

10. As a new composition of matter, a stable, oil-soluble, phosphorus- and sulfur-containing reaction product obtained by reaction of phosphorus pentasulfide and a thermal cycle stock at a temperature between about 125° C. and about 200° C. for a reaction time from about 2 hours to about 8 hours, said cycle stock being characterized by an olefin content of from about 3 per cent to about 7 per cent and an aromatic content of from about 40 per cent to about 60 per cent, and the said phosphorus pentasulfide representing from about 1 per cent to about 8 per cent by weight of the said cycle stock.

11. As a new composition of matter, a stable, oil-soluble, phosphorus- and sulfur-containing reaction product obtained by reaction of phosphorus pentasulfide and a thermal cycle stock at about 150° C. for about eight hours, said cycle stock being characterized by an olefin content of from about 3 per cent to about 7 per cent and an aromatic content of from about 40 per cent to about 60 per cent, and the said phosphorus pentasulfide representing about 5 per cent by weight of the said cycle stock.

12. As a new composition of matter, a stable, oil-soluble, phosphorus- and sulfur-containing reaction product obtained by reaction of phosphorus pentasulfide and a thermal recycle stock at about 150° C. for about eight hours, said thermal recycle stock being characterized by an olefin content of about 6 per cent and an aromatic content of 47 per cent, and the said phosphorus pentasulfide representing about 5 per cent by weight of the said thermal recycle stock.

13. As a new composition of matter, a stable, oil-soluble, phosphorus- and sulfur-containing reaction product obtained by reaction of phosphorus pentasulfide and a thermal recycle stock at about 150° C. for about four hours, said thermal recycle stock being characterized by an olefin content of about 5 per cent and an aromatic content of 57 per cent, and the said phosphorus pentasulfide representing about 5 per cent by weight of the said thermal recycle stock.

HENRY G. BERGER.
THOMAS T. NOLAND.
EVERETT W. FULLER.

REFERENCES CITED

The following references are of record in the file of this patent:

UNITED STATES PATENTS

| Number | Name | Date |
| --- | --- | --- |
| 1,615,646 | Penecke | Jan. 25, 1927 |
| 1,772,386 | Derby | Aug. 5, 1930 |
| 1,902,839 | Cunningham | Mar. 28, 1933 |
| 2,242,260 | Prutton | May 20, 1941 |
| 2,278,719 | Davis | Apr. 7, 1942 |
| 2,315,529 | Kelso | Apr. 6, 1943 |
| 2,316,083 | Loane | Apr. 6, 1943 |
| 2,316,091 | White | Apr. 6, 1943 |
| 2,356,073 | May | Aug. 15, 1944 |
| 2,351,763 | Hull | June 20, 1944 |